Patented July 8, 1924.

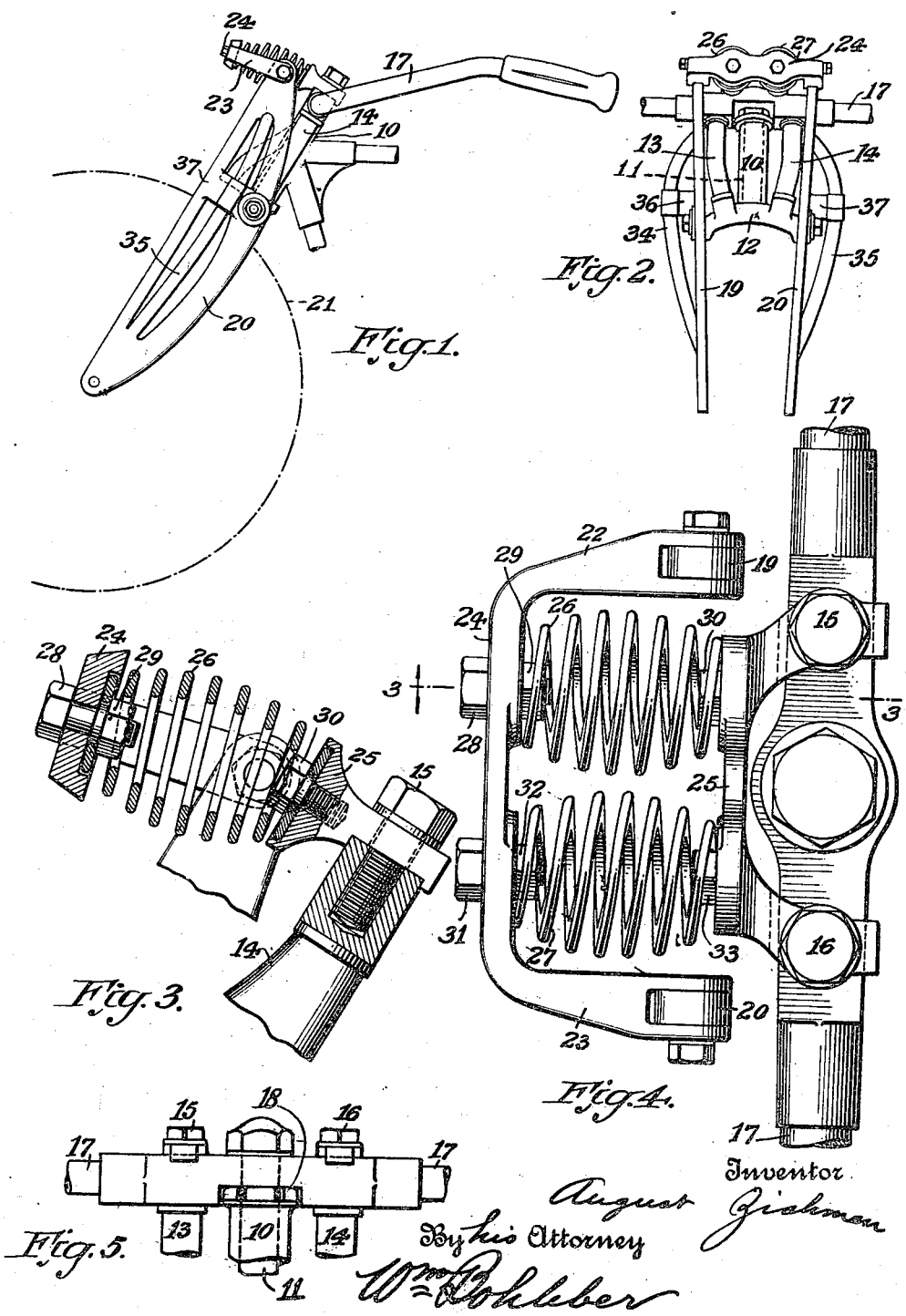

1,500,480

UNITED STATES PATENT OFFICE.

AUGUST ZICHMAN, OF NEW YORK, N. Y.

SPRING FORK FOR MOTOR CYCLES AND THE LIKE.

Application filed March 13, 1922. Serial No. 543,211.

*To all whom it may concern:*

Be it known that I, AUGUST ZICHMAN, a citizen of Latvia, residing at New York, in the county of New York and State of New York, have invented certain new and useful Improvements in Spring Forks for Motor Cycles and the like, of which the following is a full, clear, and exact description.

The invention which constitutes the subject matter of this application relates to a new and improved spring fork for motor cycles and the like, one of the more important features of which is the construction of such a device which is simple, durable, efficient in operation and cheap to manufacture.

Figure 1 is a side view of my invention showing its application to a cycle.

Figure 2 is a front elevation.

Figure 3 is a sectional detail view on an enlarged scale taken on the line 3—3 of Figure 4.

Figure 4 is a top plan view on an enlarged scale.

Figure 5 illustrates how the handle bars are connected to the improved fork.

Referring to the drawing in detail, the reference numeral 10 designates the steering head of a conventional form of bicycle or motorcycle frame. In this steering head is suitably journaled a bearing post 11, the lower end of which is integral with the cross member 12. Extending upwardly from the member 12 are two arms 13 and 14, constituting steering posts, to the upper ends of which are secured, as by bolts 15 and 16, the handle bar 17. The handle bars 17 are preferably provided with a central cut-away portion 18 to receive the upper end of the steering head 10 in order that the handle bar may freely pivot relatively to the head and cycle frame.

Pivoted to the ends of the member 12 are the side frames 19 and 20, which in conjunction with said member 12 constitute the fork of the cycle, it being understood that the lower ends, as clearly illustrated in Figure 1, are pivotally connected to the hub of the wheel 21. To the upper ends of the side frames 19 and 20 are pivotally secured the arms 22 and 23 of the spring anchoring member or yoke 24. The bolts 15 and 16, in addition to securing the handle bars, are also adapted to rigidly secure the spring anchoring member or seat 25 to the parts 13 and 14. Interposed between the spring yoke 24 and the spring seat 25 are springs 26 and 27, the former being secured to the member 24 by means of bolt 28 and nut 29, and secured to the member 25 by means of the bolt 30. The spring 27 is secured to the member 24 by means of the bolt 31 and nut 32 and to the member 25 by means of the bolt 33.

I have illustrated two springs in the drawings, but is is to be understood that any number of springs may be employed. Also that any shape and arrangement of springs may be resorted to.

The side frame 19 is provided with a truss 34 and the side frame 20 with a truss or guard 35, both of which are bowed outwardly and serve to prevent injury should the cycle accidentally fall on either side. It will be noted that the side frames 19 and 20 are pivoted to the member 12 at a point substantially midway between the upper and lower ends of said side frames, and are so connected to the spring yoke 24 that any shock given the wheel as a result of running over bumps on the road will be taken up and absorbed by the springs 26 and 27. It may also be noted that the truss members 34 and 35 are provided respectively with braces 36 and 37, the same preferably constituting an integral part of the frames. These braces are connected to the trusses at a point substantially midway between the upper and lower ends thereof to give maximum strength.

From the foregoing it will be seen that I have devised a very simple form of spring fork. I have illustrated what I consider to be the preferred embodiment of my invention but it is to be understood that I do not limit myself to the exact construction shown and described as many changes may be made in points of detail and other embodiments resorted to without deviating from the true spirit and scope of my invention.

What I claim is:—

1. A fork for motorcycles and the like comprising a cross member, a bearing post integral with the cross member and adapted to be journaled in the frame of a cycle, steering posts integral with the cross member and projecting upwardly from said cross member, a spring seat secured to said steering posts, side frames pivoted at intermediate points to said cross member, a yoke pivoted to the upper ends of said side frames, and resilient means confined between the yoke and seat.

2. A cycle steering fork comprising a cross member, a pair of steering posts integral with the cross member, a bearing post integral with the cross member and disposed midway between the aforesaid posts and adapted to be journaled in an ordinary cycle frame head, a handle bar anchored to the steering posts and reaching across the bearing post, a side frame pivotally mounted on each end of the cross member thereby forming a fork, and a shock absorber interposed between the fork and handle bar.

3. A cycle steering unit comprising a fork, a bearing post connected with the fork, steering posts reaching from the fork upwardly by which the unit is manually steered, a handle bar fixed to the steering posts, a spring seat anchored to the handle bar, an extension part reaching upwardly from the fork, a spring yoke carried on the upper end of the extension part, and a shock absorber interposed between the yoke and the spring seat.

In testimony whereof, I have hereunto set my hand this 11th day of March 1922.

AUGUST ZICHMAN.